(12) United States Patent
Tsou et al.

(10) Patent No.: US 8,072,197 B2
(45) Date of Patent: Dec. 6, 2011

(54) POWER-MANAGED SOCKET

(75) Inventors: Yu-Ping Tsou, Hsinchu (TW);
Cheng-Ting Lin, Taoyuan County (TW); An-Peng Wang, Kaohsiung (TW); Chun-Yu Chen, Yunlin County (TW); Wu-Chi Ho, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 368 days.

(21) Appl. No.: 12/429,699

(22) Filed: Apr. 24, 2009

(65) Prior Publication Data
US 2010/0109619 A1   May 6, 2010

(30) Foreign Application Priority Data
Nov. 6, 2008  (TW) ............................... 97142919 A (51) Int. Cl.
*G05F 1/00* (2006.01)
*G05F 1/565* (2006.01)

(52) U.S. Cl. ........................................ 323/273; 323/275

(58) Field of Classification Search .................. 323/234, 323/273, 275, 276, 277; 713/340, 324
See application file for complete search history.

(56) References Cited

U.S. PATENT DOCUMENTS

| | | | | |
|---|---|---|---|---|
| 4,442,492 A | * | 4/1984 | Karlsson et al. | 705/412 |
| 6,590,752 B1 | * | 7/2003 | Schaper et al. | 361/23 |
| 6,809,649 B1 | * | 10/2004 | Wendelrup et al. | 340/636.1 |
| 6,964,586 B2 | * | 11/2005 | Siddiqui | 439/669 |
| 7,584,376 B2 | * | 9/2009 | Finkelstein et al. | 713/324 |
| 2004/0081099 A1 | * | 4/2004 | Patterson et al. | 370/241 |
| 2007/0293969 A1 | * | 12/2007 | Hirai et al. | 700/114 |
| 2008/0054851 A1 | * | 3/2008 | Nozawa | 320/137 |
| 2008/0160960 A1 | * | 7/2008 | Eirif et al. | 455/411 |
| 2009/0077399 A1 | * | 3/2009 | Noda et al. | 713/320 |
| 2009/0271645 A1 | * | 10/2009 | Mori | 713/320 |
| 2010/0145542 A1 | * | 6/2010 | Chapel et al. | 700/295 |

FOREIGN PATENT DOCUMENTS

| | | |
|---|---|---|
| CN | 201057625 Y | 5/2008 |
| TW | 082203028 | 7/1993 |
| WO | 2007064118 A1 | 6/2007 |

* cited by examiner

*Primary Examiner* — Adolf Berhane
*Assistant Examiner* — Emily Pham
(74) *Attorney, Agent, or Firm* — Morris Manning & Martin LLP; Tim Tingkang Xia, Esq.

(57) ABSTRACT

The present invention relates to a power-managed socket adapted for connecting to an electrical device and thus providing the electrical device with power. The power-managed socket comprises: a detection circuit capable of detecting and outputting a characteristic value of the electrical device connected to the power-managed socket, the characteristic value being a voltage value or a current value; an identification database capable of storing parameters corresponding to at least one specific electrical product; a micro control unit capable of converting the characteristic value received from the detection circuit after the characteristic value is analog-to-digital converted into an electric signal while comparing the electric signal with signals stored in the identification database to determine whether the electrical device connected to the power-managed socket is the specific electric product; and a power circuit capable of providing the detection circuit, the identification database and the micro control unit with power.

20 Claims, 8 Drawing Sheets

POWER-MANAGED SOCKET

BACKGROUND OF THE INVENTION

1. Field of the Present Invention

The present invention generally relates to a power-managed socket and, more particularly, to a remote power-managed socket capable of detecting power consumption information to be used as an identification basis for determining the type of an electrical device that is connected thereto by comparing the detected power information with an database registered therein, and thus performing a power management operation upon the electrical device according to the known electric characteristics of the same for the purpose of enhancing power consumption efficiency. With the aforesaid power-managed socket, any kind of electric product can be identified as soon as it is plugged into the power-managed socket, and thereby, not only all the electric products connected to the power-managed socket that are identified can be scheduled to perform a malfunction inspection or a remote maintenance, but also their power consumption can be monitored and controlled by the power-managed socket for achieving optimal efficiency.

2. Background of the Present Invention

Although there are already many studies carried out on standby power reduction in electric devices, only a few of which had focused their efforts in developing a power management instrument for controlling and managing the standby power consumption of any electric product currently available on the market in a wired or wireless manner. That is, there are plenty of papers and patents on remote power control related to its style and hardware architecture, but there is no systematic study about how to setup the connection between a remote power control and an electric device as well as how to setup the operation mode for a remote power control.

The technology of remote-control power-managed socket disclosed in the present invention, being designed to work cooperative with power consumption characteristics of common household electrical appliances and the intelligence family energy-saving system, is applied to a power-managed socket, being substantially an intelligence energy-saving system that is embedded with an environmental parameter prediction algorithm and a database of operation modes for allowing the same to select an operation mode for the electric device connected thereto according to its power consumption characteristics, by that the type of the electric device connected thereto is being identified and thus classified automatically according to their predicted power consumption, and then the result of the identification is send to an controller for determining an operation mode for the identified electric device. It is noted that there is already a good power-saving controller disclosed in Taiwan Pat. 082203028. Being an improvement over the aforesaid power-saving controller, the remote-control power-managed socket of the present invention is an intelligence device not only capable of identifying the type of the electric device connected thereto in an automatic manner, but also capable of performing a power cut-off evaluation according to the type of the identified electric device. Moreover, as all the power consumption condition of the electric devices connected to the power-managed socket can be sent to a master controller in a wireless manner, the remote power-saving management as well as the remote maintenance can be achieved.

SUMMARY OF THE PRESENT INVENTION

It is an object of the present invention to provide a power-managed socket, being a remote-control power-managed socket with device identification and power management adapted for every household electrical appliance available on the market, capable of detecting a power consumption information to be used as an identification basis for determining the type of an electrical device that is connected thereto by comparing the detected power information with an database registered therein and thus performing a power management operation upon the connected electrical device according to the known electric characteristics of the connected electrical device as it had been identified for the purpose of enhancing power consumption efficiency. Moreover, all the power consumption information detected by the power-managed socket is used as a basis for automatic cut-off and overload protection, by that all the electric products connected to the power-managed socket that are identified can be scheduled to perform a malfunction inspection or a remote maintenance. In addition, as any kind of electric products can be identified as soon as it is plugged into the power-managed socket, the power-managed socket can be used as a relay for transmitting the power consumption information related to the electrical devices connected thereto to a controller for the purpose of enhancing power consumption efficiency.

Further scope of the present application will become more apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The objects and spirits of several embodiments of the present invention will be readily understood by the accompanying drawings and detailed descriptions, wherein.

DETAILED DESCRIPTION OF THE PREFERRED EMBODIMENTS

The present invention can be exemplified but not limited by various embodiments as described hereinafter.

Figure 1:
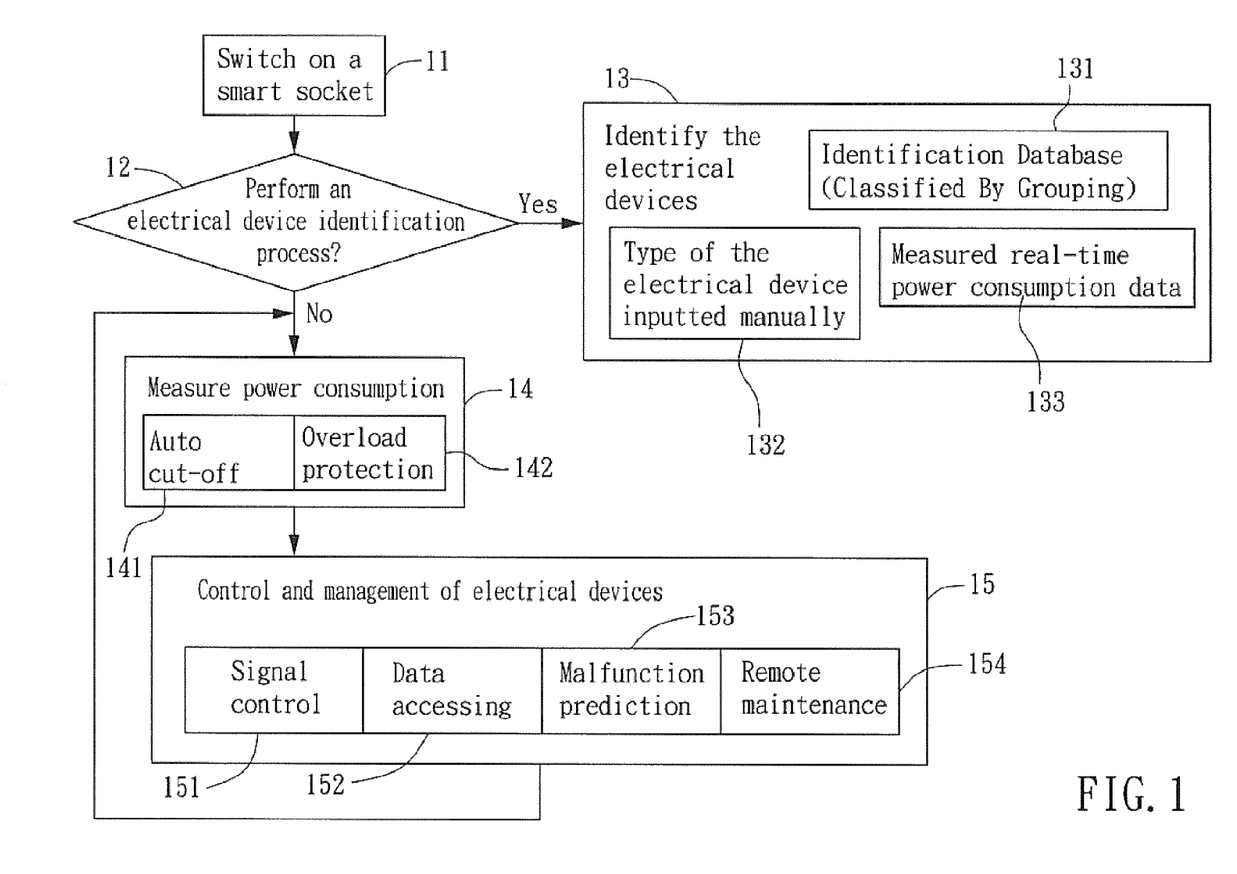
FIG. 1 is a flowchart depicting the identification and control steps performed in a power-managed socket of the present invention.

Please refer to FIG. 1, which is a flowchart depicting the identification and control steps performed in a power-managed socket of the present invention. As shown in FIG. 1, the flow starts from step 11. A power-managed socket is switched on in step 11, and then the flow proceeds to step 12. In step 12, an evaluation is made for determining whether or not to perform a device identification operation upon the electrical devices connected to the power-managed socket. If so, the flow proceeds to step 13. Otherwise, the flow proceeds to step 14. In step 13, an electrical device identification operation is performed, in which the power-managed socket is adapted for every household electrical appliance available on the market and is used for detecting the power consumption information of all the electrical devices connected thereto so as to be used as an identification basis for determining the types of those electrical devices that are connected thereto by comparing the detected power information with an database registered in the power-managed socket. It is noted that during the device identification, there are three ways of knowing the types of the electrical devices: (1) by comparing with an identification database (classified by grouping) already registered in the power-managed socket, as shown in step 131; (2) by a type of electrical device inputted manually, as shown in step 132; and (3) by comparing with a measured real-time power consumption data related to the electrical devices, as shown in step 133.

In step 14, a measurement related to the power consumption of the electrical devices is performed if it is determined not to perform the device identification operation upon the electrical devices connected to the power-managed socket in step 12. In an embodiment of the invention, the power consumption information detected by the power-managed socket is used as a basis for automatic cut-off (in step 141) and overload protection (in step 142), by that the safety of all the electric products connected to the power-managed socket can be ensured. Then the flow proceeds to step 15. In step 15, an electrical device control and management operation is performed, which includes a signal control process (in step 151), a data access process (in step 152), a malfunction inspection process (in step 153) and a remote maintenance process (in step 154).

In step 12, the electrical device identification process is performed according to the power identification database storing information related to the actual power consumption of each electrical device, including the power consumption of each electrical device in a standby state. Moreover, the detected sampling frequencies can be changed according to practical demand. The detected sampling frequencies can be converted in two modes, including a self-detection mode wherein the detected sampling frequencies are converted to enhance the detected frequency of power and a normal operation mode wherein the detected frequency is converted to the original power frequency.

The information related to the power consumption of each electrical device can be used for power management including auto cut-off and overload protection to achieve malfunction prediction and remote maintenance. When an electrical device is used, it is identified according to the detected information. With relay control, the information can be transmitted by a communication interface.

Please also refer to Table 1 for the sampling frequencies of the power-managed socket in the present invention. Please note that the sampling frequencies are only exemplary and thus the present invention is not limited thereto. There are four embodiments disclosed in the present invention for identifying the electrical devices connected to the power-managed socket.

TABLE 1

Sampling Frequencies in the Present Invention

| Operation Modes | Self-Detection Mode | Normal Operation Mode |
|---|---|---|
| Samples per 60 Hz | 128 | 64 |
| Sampling Frequency | 7.68 kHz | 4.096 kHz |

First Embodiment

The detected sampling frequencies can be changed according to practical demand. With the voltage frequency of the AC utility being 60 Hz, the detected sampling frequencies can be converted in two modes, including a self-detection mode and a normal operation mode.

When the electrical device starts to operate in the self-detection mode, the number of samples is 128 at the sampling frequency of 7.68 kHz. The detected sampling frequencies are converted to enhance the detected frequency of power and increase the detected sampling frequency with more precision.

When the electrical device operates in the normal operation mode, the number of samples is 64 at the sampling frequency of 4.096 kHz. The detected frequency is converted to the original power frequency so that the system is provided with surplus time for other data processes such as data transmission and receiving.

Second Embodiment

Establishing an Identification Database

Figure 2A:
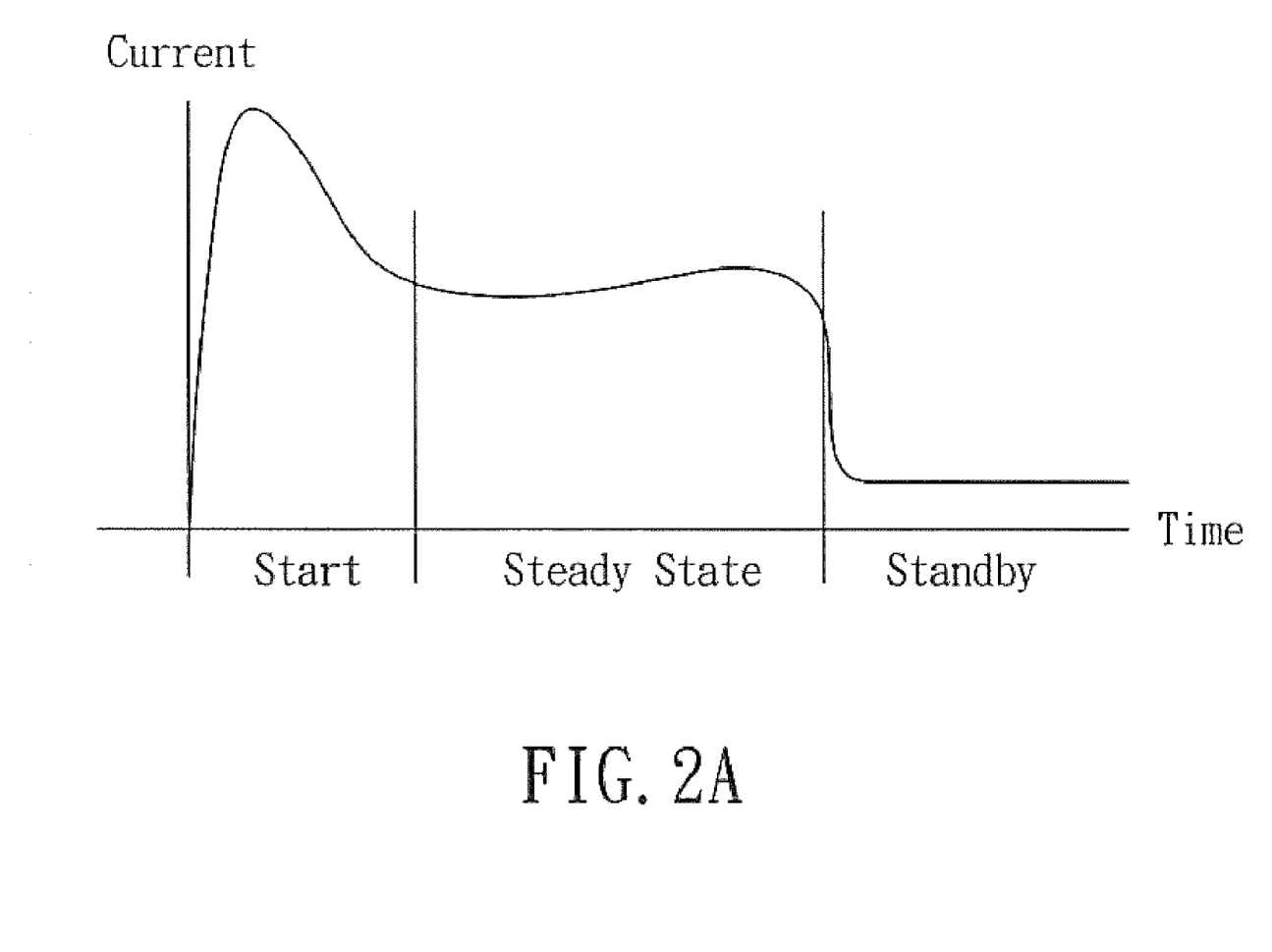
FIG. 2A is a power consumption curve used by a power-managed socket of the present invention for identifying the type of an electrical device connected thereto.

Please refer to FIG. 2A, which is a power consumption curve used by a power-managed socket of the present invention for identifying the type of an electrical device connected thereto. The longitudinal coordinate (Y-axis) is for the current (I) and the transversal coordinate (X-axis) is for the time. Since the power voltage of a state is set such us 110V or 220V, the information related to the voltage is constant. Therefore, only the current (I) is taken into account. The presently available embedded database is constructed for all the household electrical devices based on the power consumption curve to comprise three columns: start, steady state power and standby power, which are stored in the storage unit for identifying household electrical devices.

When an electrical device is provided with power, information related to start, steady state and standby power can be obtained according to the power consumption (based on the current value) from the moment the electrical device is turned on to the moment the electrical device operates in a standby mode.

The information can be formatted to comprise for example: the activation power indicating a transient current value when the specific electrical product is being turned on, including information related to the time and power required for the specific electrical product to start to operate in a steady state; the steady-state power indicating a current value required to maintain the specific electrical product to operate in the steady state, including information related to the power; and the standby power indicating a current value of the specific electrical product after the specific electrical product starts to operate in a standby mode, including information related to the time and power required for the specific electrical product to start to operate in the standby mode.

Figure 2B:
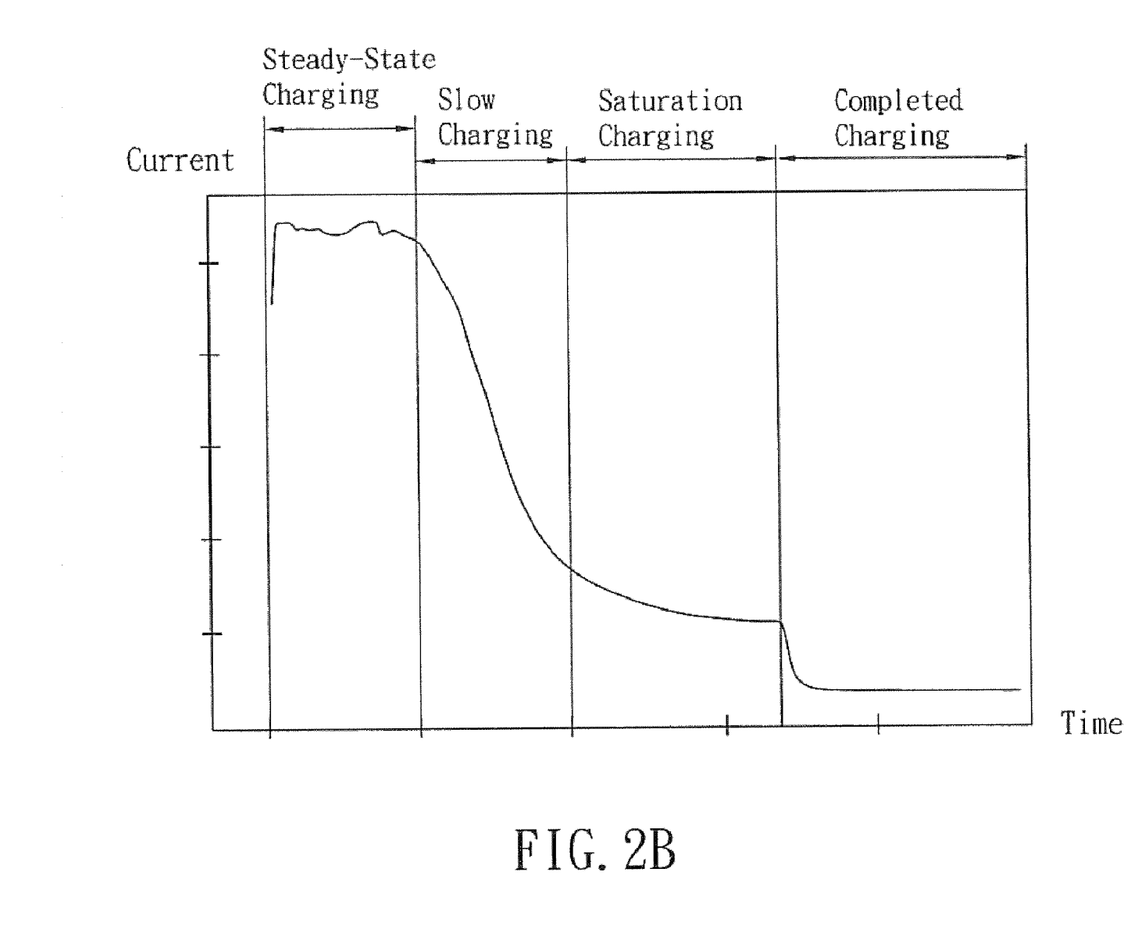
FIG. 2B is a power consumption curve used by a power-managed socket of the present invention for identifying the type of a charger connected thereto.

As stated above, please refer to FIG. 2B, which is a power consumption curve used by a power-managed socket of the present invention for identifying the type of a charger connected thereto. When the electrical device is being charged, a steady-state power is maintained for a period of time. After the charger completes charging the electrical device, the loading power decreases gradually until the electrical device is saturatedly charged. Finally, the electrical device is in a standby mode when the electrical device is fully charged. The information related to charging comprises steady-state charging, slow charging, saturation charging and completed charging. Therefore, the information related to the steady-state charging, the slow charging, the saturation charging and the completed charging can be obtained according to the power consumption (based on the current value). The information is formatted to comprise for example: the steady-state charging indicating a current value required for the specific electrical product to operate in a charging state, including information related to the power; the slow charging indicating a current value required for the specific electrical product when it starts to operate in a slow-charging state, including information related to the time and power required for the specific electrical product to start to operate in a saturation charging state from the steady-state charging; the saturation charging indicating a current value after the specific electrical product is saturatedly charged, including information related to the time and power required for the specific electrical product to start to operate in a saturation charging state from the steady-state charging; and the completed charging indicating a current value after the specific electrical product is saturatedly charged and starts to operate in a standby mode, including information related to the time and power required for the specific electrical product to be fully charged from the steady-state charging.

Third Embodiment

Real-Time Learning Database for an Electrical Device

When an electrical device is newly added, the existing voltage/current measurement can be used to acquire the database for the type of the newly added electrical device on line.

Fourth Embodiment

Newly Added Database

When an electrical device is newly added, the type of the electrical device can be stored in an electrical device classification database. Moreover, the electrical device is identified according to the standby/normal power identification database including actual power consumption.

The user is capable of controlling the switch (relay) of the power-managed socket under the following conditions:

1. When the accumulated power consumption of the electrical device connected to the power-managed socket or the power bill exceeds a default value, the switch is commanded to cut off the power supplied to the power-managed socket.

2. When the electrical device connected to the power-managed socket is provided with auto cut-off and overload protection, the switch is commanded to cut off the power supplied to the power-managed socket as the load of the power-managed socket exceeds a default value. Generally, if an electrical device has not been started for a long time, the probability of malfunction of the electrical device increases. By using the information related to power consumption, the power-managed socket is determined whether it has not been used for too long. Therefore, the power-managed socket is provided with intelligence in determining whether the electrical device has not been used for too long and automatically restoring the power.

Figure 3A:
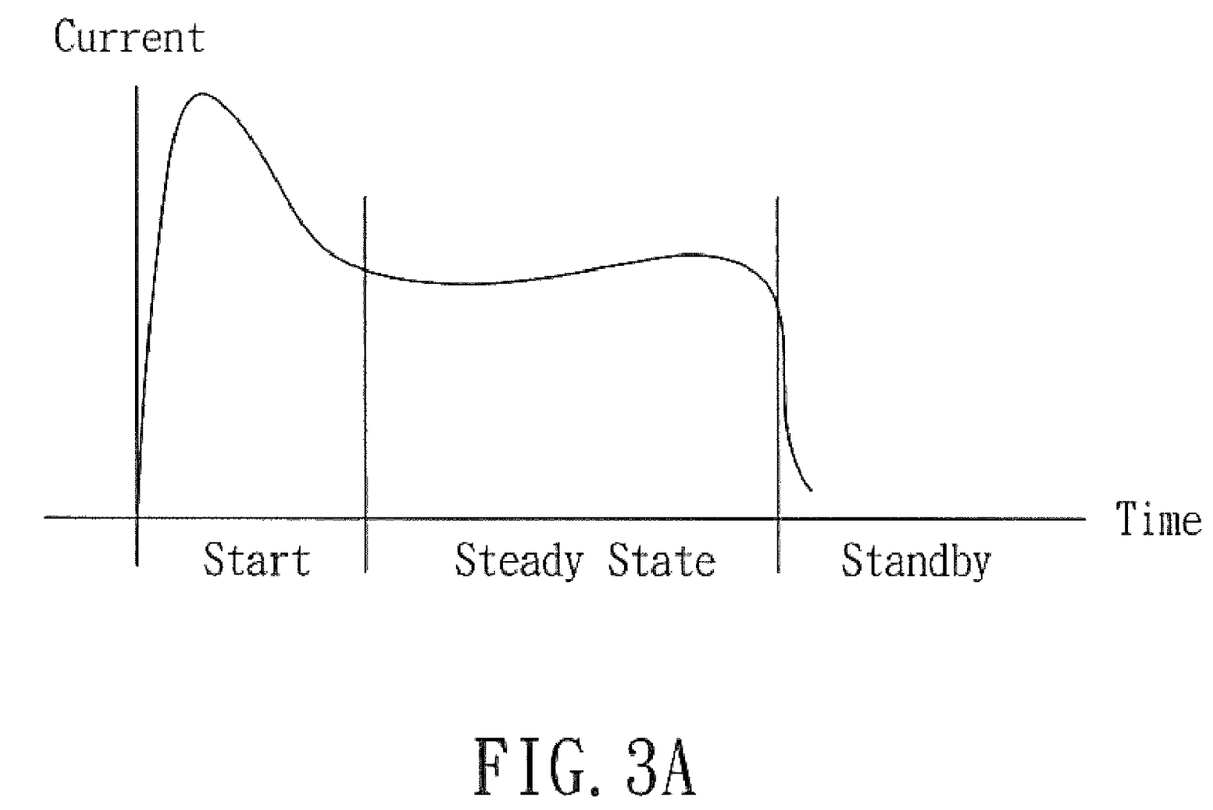
FIG. 3A shows the power consumption curve of an electric device after it is connected to a power-managed socket of the present invention and is controlled thereby.

3. Please refer to FIG. 3A for the power consumption curve of an electric device after it is connected to a power-managed socket of the present invention and is controlled thereby. When an electrical device is connected to the power-managed socket, the switch is commanded to cut off the power supplied to the power-managed socket after the standby power is maintained because the standby power consumes power.

Figure 3B:
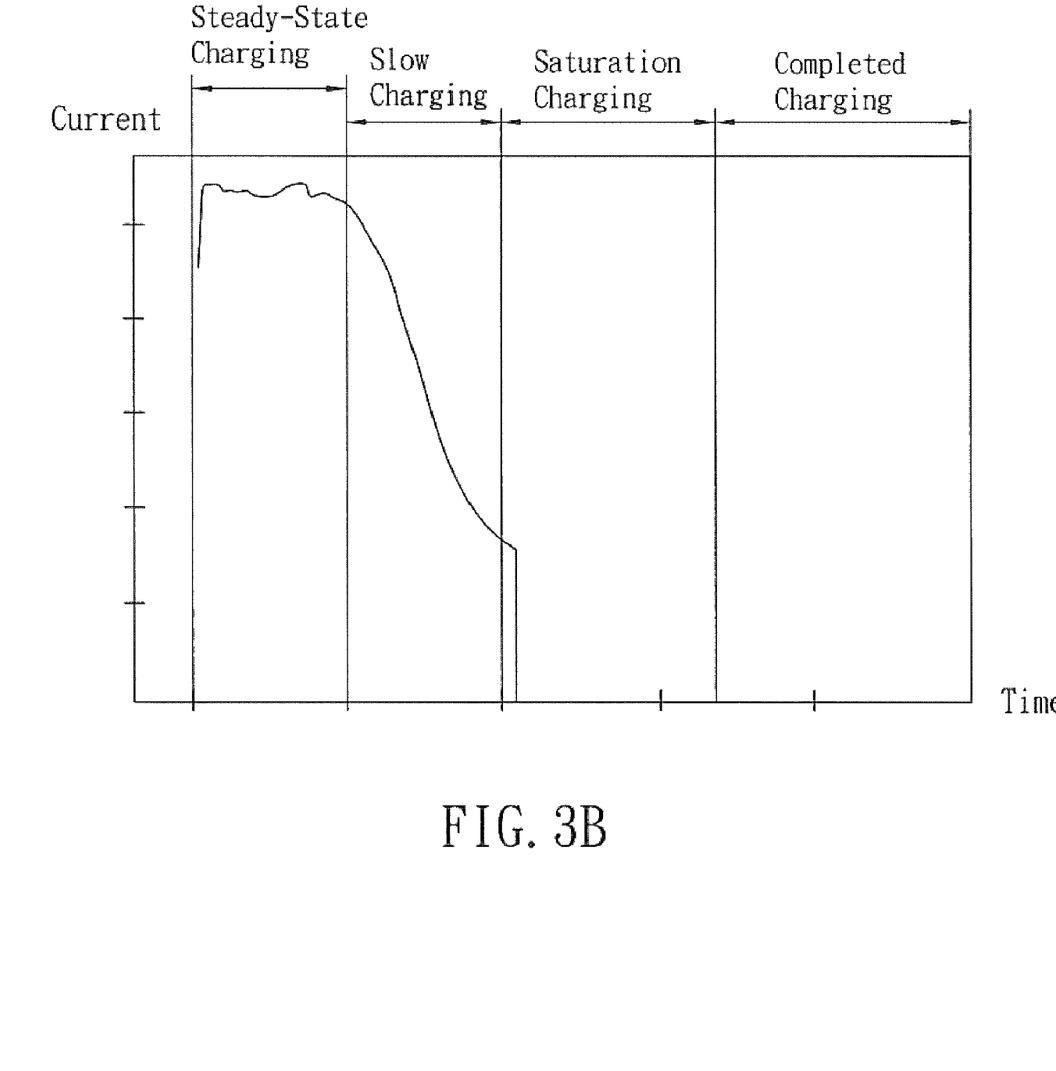
FIG. 3B shows the power consumption curve of a charger after it is connected to a power-managed socket of the present invention and is controlled thereby.

4. Please refer to FIG. 3B for the power consumption curve of a charger after it is connected to a power-managed socket of the present invention and is controlled thereby. When a charger is connected to the power-managed socket, the charger is determined whether it is in a saturation charging state (prior to the standby power state) or whether it is in a completed charging state (after the standby power state) according to the charged current value. If so, the switch is commanded to cut off the power supplied to the power-managed socket after the charger fully charges the power-managed socket and is in the saturation charging state because a standby power is maintained and it consumes power.

Figure 4:
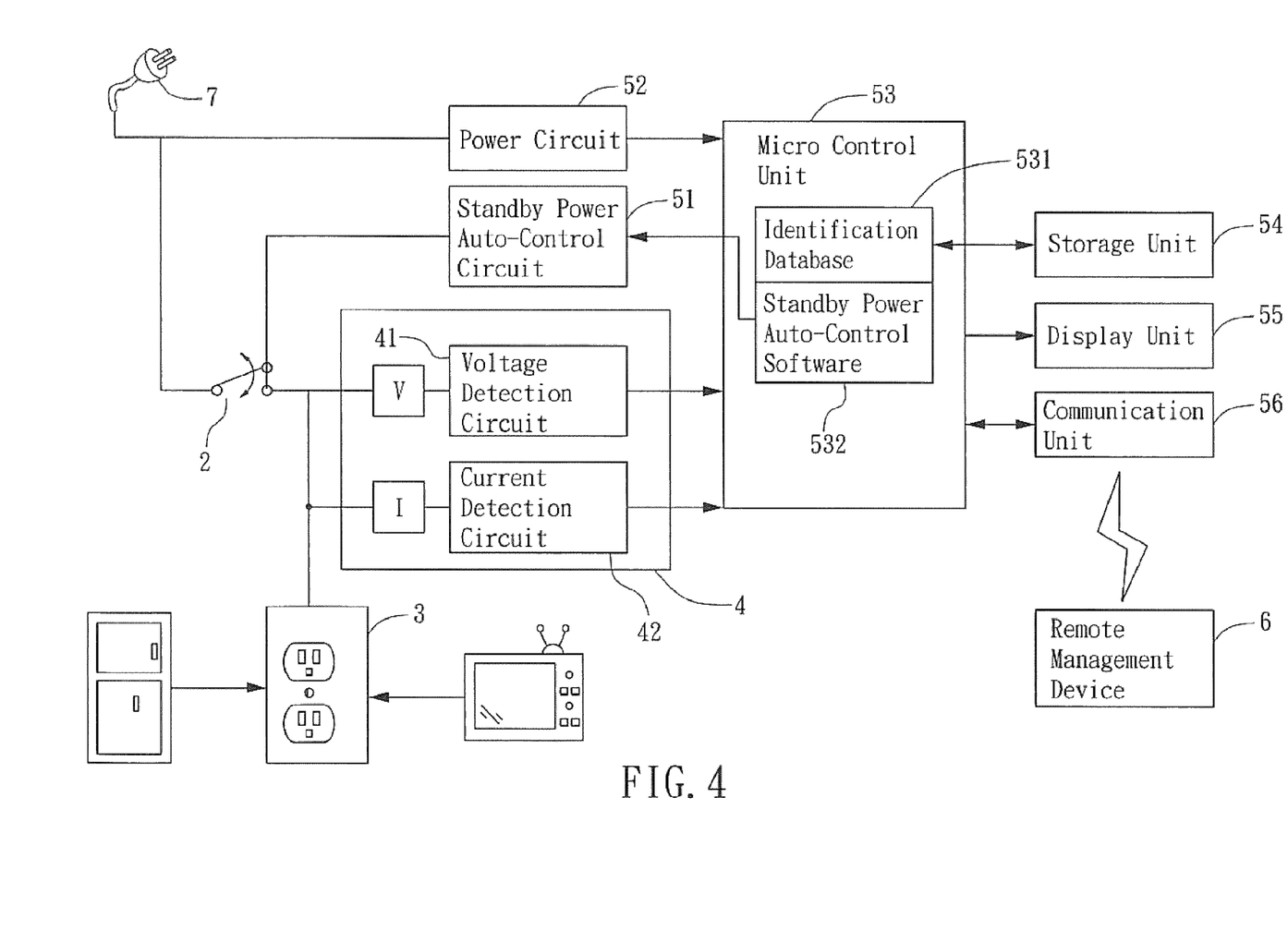
FIG. 4 is a functional block diagram of a power-managed socket of the present invention.
Figure 5:
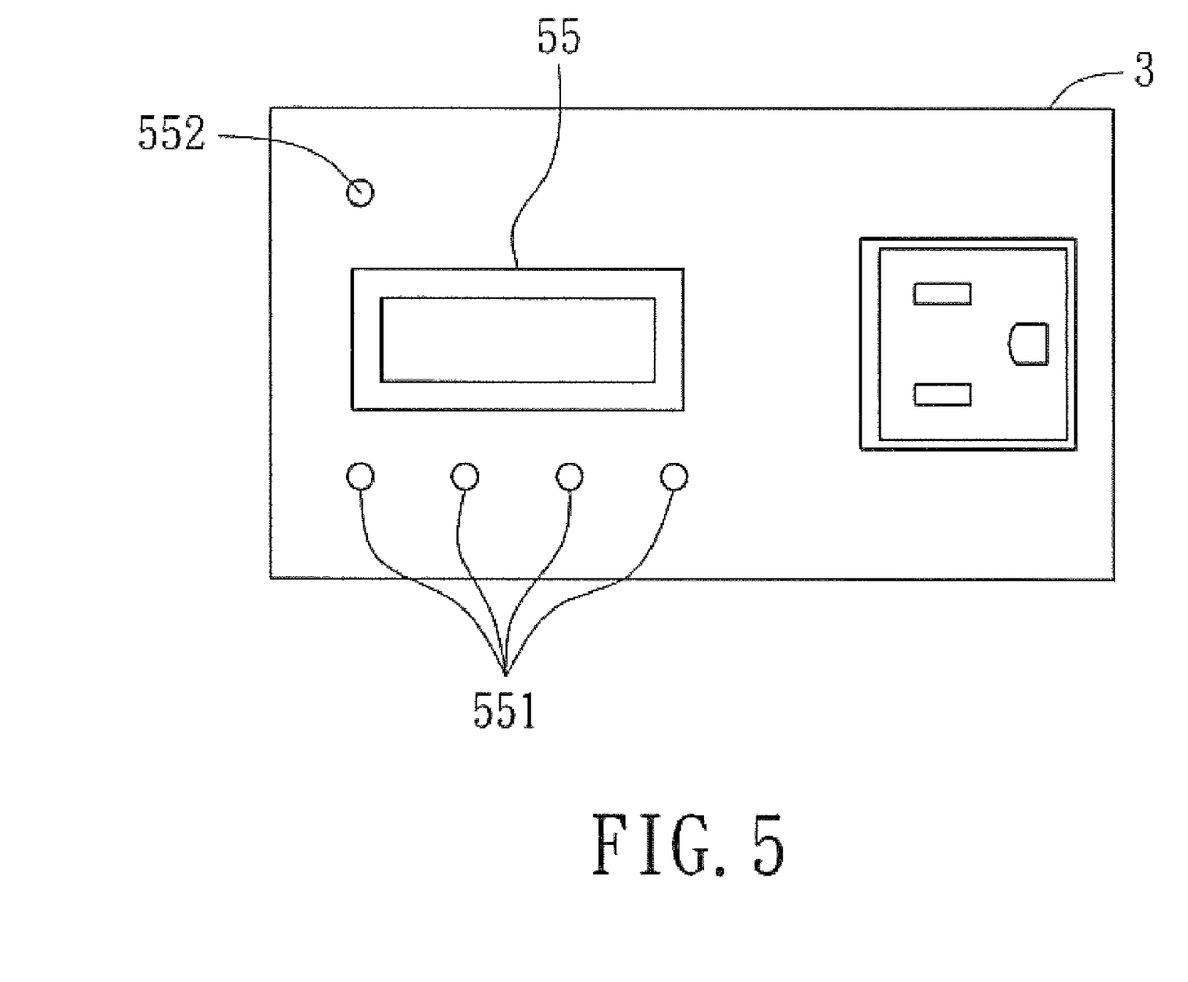
FIG. 5 is a front view of a socket of the present invention.
Figure 6:
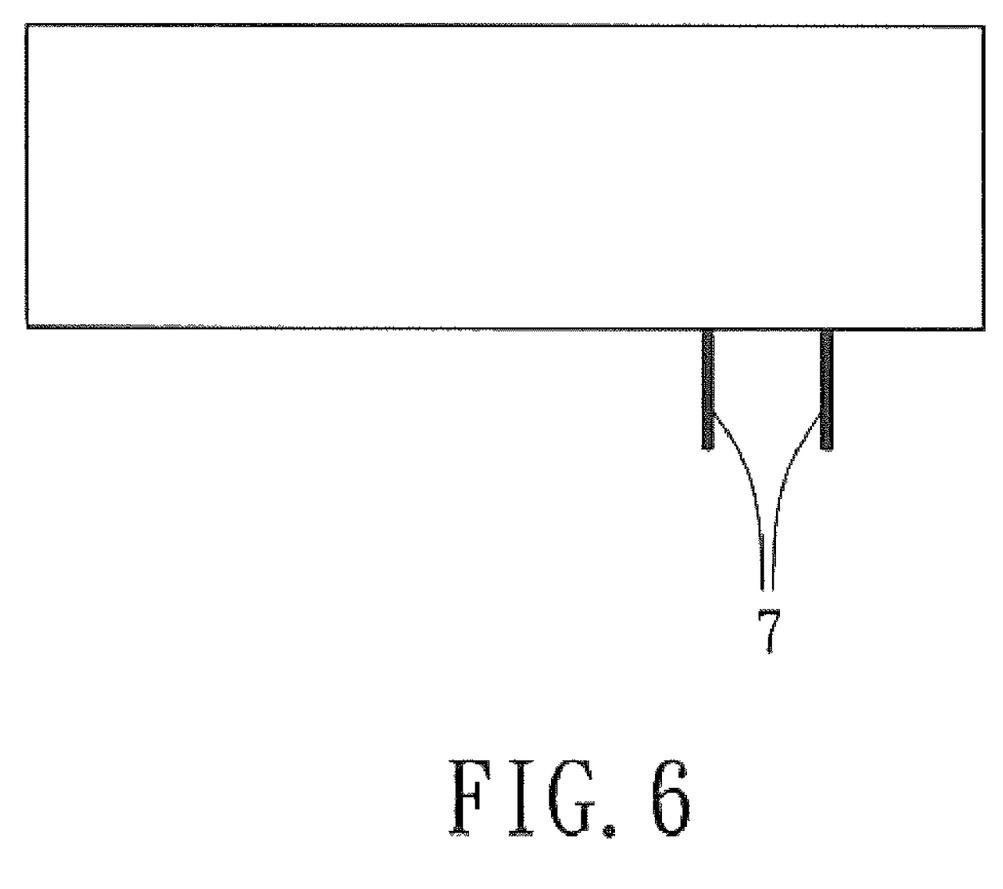
FIG. 6 is a side view of a socket of the present invention.

Please refer to FIG. 4, which is a functional block diagram of a power-managed socket having a socket with a front view in FIG. 5 and a side view in FIG. 6. The power-managed socket comprises a socket 3, a plug 7, a display unit 55, a keypad 551 composed of a plurality of keys, and an indicator lamp 552. The socket 3 is connected to a switch (or a relay) 2 for controlling the power supplied to the socket 3.

The power-managed socket further comprises: a detection circuit 4, comprising a voltage detection circuit 41 and a current detection circuit 42 so as to detect and output a characteristic value of the electrical device (such as a TV set or a refrigerator in FIG. 4) connected to the socket 3. The characteristic value is a voltage value or a current value. The detection circuit 4 is configured with at least two detected sampling frequencies to be used in different operation modes including a self-detection mode and a normal operation mode. When the electrical device starts to operate in the self-detection mode, the detected sampling frequency is increased. When the electrical device operates in the normal operation mode, the detected frequency is converted to the original power frequency.

The power-managed socket further comprises: an identification database 531, for storing current parameters of at least one specific electrical product. The identification database 531 is implemented by a software program. The identification database 531 is registered with information related to an activation power, a steady-state power and a standby power of at least one specific electrical product or information related to steady-state charging, slow charging, saturation charging and completed charging of a charger.

The power-managed socket further comprises: a micro control unit 53 capable of converting the characteristic value received from the detection circuit 4 after the characteristic value is analog-to-digital converted into an electric signal while comparing the electric signal with signals stored in the identification database 531 to determine whether the electrical device connected to the socket is the specific electric product.

The power-managed socket further comprises: a standby power auto-control circuit 51 connected to the switch 2 and the micro control unit 531 so that the standby power auto-control circuit 51 is controlled by a standby power auto-control software 532 to command the switch 2 to cut off the power supplied to the socket 3 when the accumulated power consumption or the load of the power-managed socket exceeds a default value before or after the electrical device starts to operate in a standby mode.

The power-managed socket further comprises: a storage unit 54 being externally connected to the micro control unit 53 (as in the present embodiment) or internally embedded in the micro control unit 53 (which is readily understood by anyone with ordinary skill in the art). The storage unit 54 is implemented by an electrically erasable programmable read only memory (EEPROM) or flash memory.

The power-managed socket further comprises: a communication unit 56 connected to the micro control unit 53. The communication unit 56 is further connected to a remote management device 6 by wired communication (through a power line network) or wireless communication (as in the present embodiment). The remote management device 6 is a personal computer, a notebook computer, a digital photo frame, a home server, a home gateway, a personal digital assistant or a smart phone.

The power-managed socket further comprises: a display unit 55 connected to the micro control unit 53. The display unit 55 is implemented by a crystal liquid display. The display unit 55 is capable of displaying data comprising a current value (I), a voltage value (V), a power value (W), a watt-hour product (WH), a frequency value (F), a power bill (cost) and an amount of carbon dioxide ($CO_2$).

The power-managed socket further comprises: a power circuit 52 capable of providing the detection circuit 4, the identification database 531 and the micro control unit 53 with power. The display unit 55 further comprises a memory and is provided with content displaying/erasing, switch displaying/setting, power bill displaying/setting, and time displaying/setting.

The plug 7 is connected to the power circuit 52 and the switch 2. The plug can be plugged into a commercially available socket. The cover of the socket 3 can be used to cover a general socket. As a result, the commercially available socket can be modified into a power-managed socket with good looks as well as practicability. Anyone with ordinary skill in the art can replace the plug 7 by connecting directly to the AC utility. Therefore, it is within the scope of the present invention with or without the plug 7.

The communication unit 56 can be used to transmit the information related to the power consumption by wireless communication. The remote management device 6 is used for management analysis according to the electrical device and actual power consumption. The remote management device 6 cuts off the switch 2 of the power-managed socket if abnormality happens.

Accordingly, the present invention discloses a power-managed socket, being a remote-control power-managed socket with device identification and power management adapted for every household electrical appliance available on the market, capable of detecting a power consumption information to be used as an identification basis for determining the type of an electrical device that is connected thereto by comparing the detected power information with an database registered therein and thus performing a power management operation upon the connected electrical device according to the known electric characteristics of the connected electrical device as it had been identified for the purpose of enhancing power consumption efficiency. Moreover, all the power consumption information detected by the power-managed socket is used as a basis for automatic cut-off and overload protection, by that all the electric products connected to the power-managed socket that are identified can be scheduled to perform a malfunction inspection or a remote maintenance. In addition, as any kind of electric products can be identified as soon as it is plugged into the power-managed socket, the power-managed socket can be used as a relay for transmitting the power consumption information related to the electrical devices connected thereto to a controller for the purpose of enhancing power consumption efficiency. Therefore, the present invention is novel, useful, and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A power-managed socket comprising:
   a socket for connecting to an electrical device and thus providing the electrical device with power;
   a detection circuit capable of detecting and outputting a characteristic value of the electrical device connected to the socket, the characteristic value being a voltage value or a current value;
   an identification database capable of storing parameters corresponding to at least one specific electrical product;
   a micro control unit capable of converting the characteristic value received from the detection circuit after the characteristic value is analog-to-digital converted into an electric signal while comparing the electric signal with signals stored in the identification database to determine whether the electrical device connected to the socket is the specific electric product;
   a power circuit capable of providing the detection circuit, the identification database and the micro control unit with power;
   a switch connected to the socket to control the power supplied to the socket; and
   a standby power auto-control circuit connected to the switch and the micro control unit so that the standby power auto-control circuit is controlled by a standby power auto-control software to command the switch to cut off the power supplied to the socket when the accumulated power consumption or the load of the socket exceeds a default value before or after the electrical device starts to operate in a standby mode.

2. The power-managed socket as recited in claim 1, wherein the identification database is implemented by a software program.

3. The power-managed socket as recited in claim 1, further comprising a communication unit connected to the micro control unit.

4. The power-managed socket as recited in claim 3, wherein the communication unit is connected to a remote management device by wired or wireless communication.

5. The power-managed socket as recited in claim 4, wherein the remote management device is a personal computer, a notebook computer, a digital photo frame, a home server, a home gateway, a personal digital assistant or a smart phone.

6. The power-managed socket as recited in claim 1, further comprising a storage unit being externally connected to the micro control unit or internally embedded in the micro control unit.

7. The power-managed socket as recited in claim 6, wherein the storage unit is implemented by an electrically erasable programmable read only memory (EEPROM) or a flash memory.

8. The power-managed socket as recited in claim 1, further comprising a display unit connected to the micro control unit.

9. The power-managed socket as recited in claim 8, wherein the display unit is implemented by a crystal liquid display.

10. The power-managed socket as recited in claim 8, wherein the display unit is capable of displaying data comprising a current value, a voltage value, a power value, a watt-hour product, a frequency value, a power bill and an amount of carbon dioxide.

11. The power-managed socket as recited in claim 8, wherein the display unit further comprises a keypad comprising a plurality of keys.

12. The power-managed socket as recited in claim 1, wherein the identification database is registered with information related to an activation power, a steady-state power and a standby power of the specific electrical product.

13. The power-managed socket as recited in claim 1, further comprising a plug connected to the power circuit and the switch.

14. The power-managed socket as recited in claim 1, wherein the identification database is registered with information related to steady-state charging, slow charging, saturation charging and completed charging of the specific electrical product.

15. The power-managed socket as recited in claim 12, wherein the information related to the activation power, the steady-state power and the standby power of the specific electrical product is formatted as:
   the activation power indicating a transient current value when the specific electrical product is being turned on, including information related to the time and power required for the specific electrical product to start to operate in a steady state;
   the steady-state power indicating a current value required to maintain the specific electrical product to operate in the steady state, including information related to the power; and
   the standby power indicating a current value of the specific electrical product after the specific electrical product starts to operate in a standby mode, including information related to the time and power required for the specific electrical product to start to operate in the standby mode.

16. The power-managed socket as recited in claim 14, wherein the information related to the steady-state charging, the slow charging, the saturation charging and the completed charging of the specific electrical product is formatted as:
   the steady-state charging indicating a current value required for the specific electrical product to operate in a charging state, including information related to the power;
   the slow charging indicating a current value required for the specific electrical product when it starts to operate in a slow-charging state, including information related to the time and power required for the specific electrical product to start to operate in a saturation charging state from the steady-state charging;
   the saturation charging indicating a current value after the specific electrical product is saturatedly charged, including information related to the time and power required for the specific electrical product to start to operate in a saturation charging state from the steady-state charging; and
   the completed charging indicating a current value after the specific electrical product is saturatedly charged and starts to operate in a standby mode, including information related to the time and power required for the specific electrical product to be fully charged from the steady-state charging.

17. The power-managed socket as recited in claim 1, wherein the detection circuit is configured with at least two detected sampling frequencies to be used in different operation modes including a self-detection mode and a normal operation mode.

18. The power-managed socket as recited in claim 1, wherein two detected sampling frequencies respectively adapted for an electrical device detection mode and a normal operation mode are 7.68 kHz and 4.096 kHz, respectively, when the voltage frequency is 60 Hz.

19. A power-managed socket comprising:
   a socket for connecting to an electrical device and thus providing the electrical device with power;
   a detection circuit capable of detecting and outputting a characteristic value of the electrical device connected to the socket, the characteristic value being a voltage value or a current value;
   an identification database capable of storing parameters corresponding to at least one specific electrical product;
   a micro control unit capable of converting the characteristic value received from the detection circuit after the characteristic value is analog-to-digital converted into an electric signal while comparing the electric signal with signals stored in the identification database to determine whether the electrical device connected to the socket is the specific electric product; and
   a power circuit capable of providing the detection circuit, the identification database and the micro control unit with power;
   wherein the identification database is registered with information related to steady-state charging, slow charging, saturation charging and completed charging of the specific electrical product;
   wherein the information relate to the steady-state charging, the slow charging, the saturation charging and the completed charging of the specific electrical product is formatted as:
      the steady-state charging indicating a current value required for the specific electrical product to operate in a charging state, including information related to the power;
      the slow charging indicating a current value required for the specific electrical product when it starts to operate in a slow-charging state, including information related to the time and power required for the specific electrical product to start to operate in a saturation charging state from the steady-state charging;
      the saturation charging indicating a current value after the specific electrical product is saturatedly charged, including information related to the time and power required for the specific electrical product to start to operate in a saturation charging state from the steady-state charging; and
      the completed charging indicating a current value after the specific electrical product is saturatedly charged and starts to operate in a standby mode, including information related to the time and power required for the specific electrical product to be fully charged from the steady-state charging.

20. A power-managed socket comprising:
   a socket for connecting to an electrical device and thus providing the electrical device with power;

a detection circuit capable of detecting and outputting a characteristic value of the electrical device connected to the socket, the characteristic value being a voltage value or a current value;
an identification database capable of storing parameters corresponding to at least one specific electrical product;
a micro control unit capable of converting the characteristic value received from the detection circuit after the characteristic value is analog-to-digital converted into an electric signal while comparing the electric signal with signals stored it the identification database to determine whether the electrical device connected to the socket is the specific electric product; and
a power circuit capable of providing the detection circuit, the identification database and the micro control unit with power;
wherein the identification database is registered with information related to an activation power, a steady-state power and a standby power of the specific electrical product.
wherein the information related to the activation power, the steady-state power and the standby power of the specific electrical product is formatted as:
the activation power indicating a transient current value when the specific electrical product is being turned on, including information related to the time and power required for the specific electrical product to start to operate in a steady state;
the steady-state power indicating a current value required to maintain the specific electrical product to operate in the steady state, including information related to the power; and
the standby power indicating a current value of the specific electrical product after the specific electrical product starts to operate in a standby mode, including information related to the time and power required for the specific electrical product to start to operate in standby mode.

* * * * *